April 16, 1940. H. T. HUGHES 2,197,662
TIRE OF THE TYPE ADAPTED TO BE USED ON AUTOMOBILES AND VARIOUS VEHICLES
Filed May 17, 1937
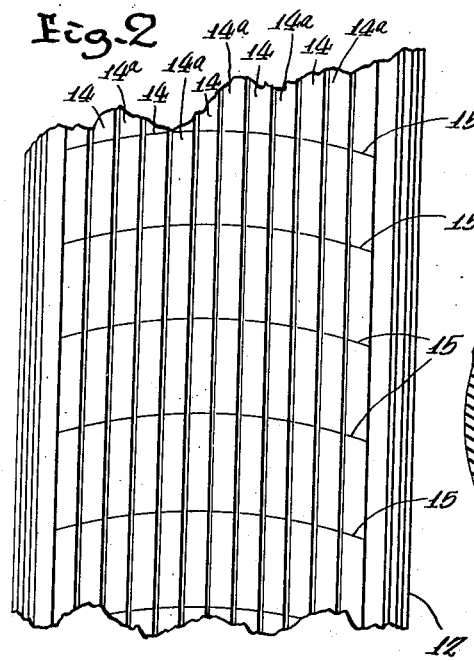
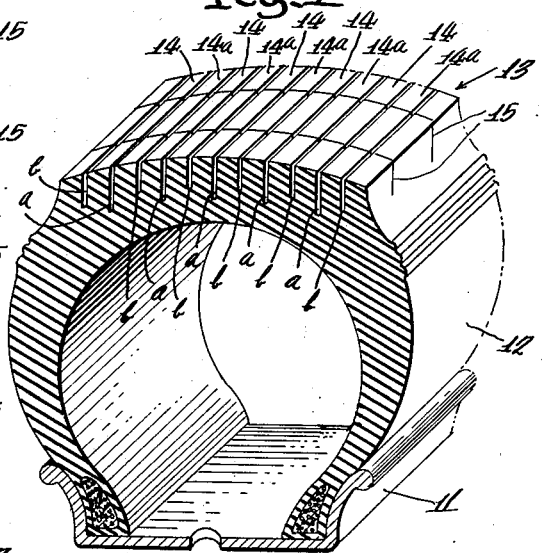
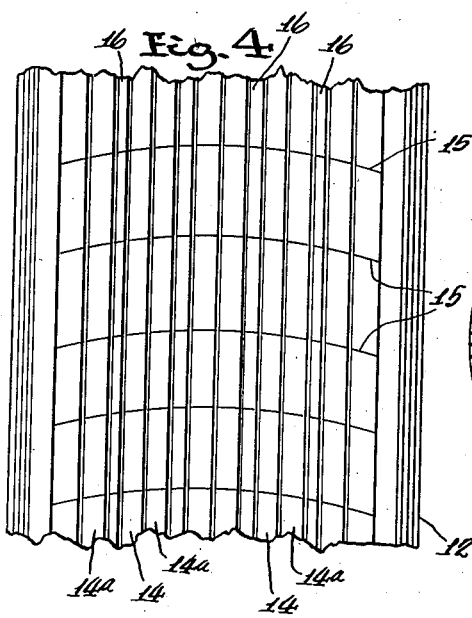
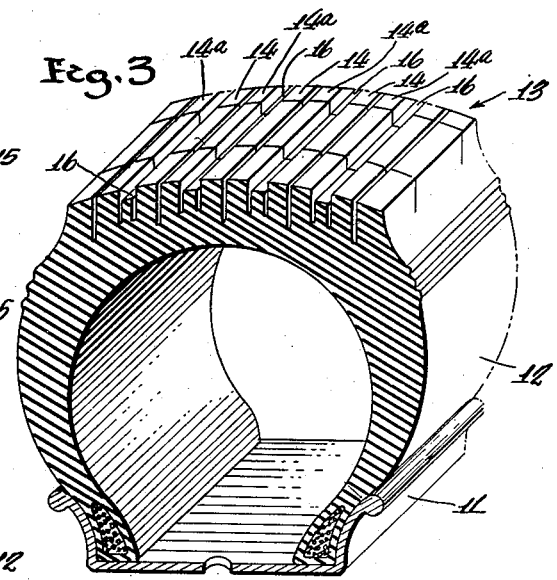
Hugh T. Hughes
INVENTOR
BY Walter C. Kelsey
ATTORNEY Patented Apr. 16, 1940

2,197,662

UNITED STATES PATENT OFFICE 2,197,662

TIRE OF THE TYPE ADAPTED TO BE USED ON AUTOMOBILES AND VARIOUS VEHICLES

Hugh T. Hughes, Cleveland, Ohio, assignor of one-half to Hannah Lorig, Cleveland, Ohio Application May 17, 1937, Serial No. 142,998

5 Claims. (Cl. 152—209)

This invention relates to new and novel improvements in tires for vehicles, and more particularly to an improved tire and tread therefor.

An object of my invention is to provide an improved tread for a tire, providing for greater flexibility and greater flexing of the tread.

Another object is to provide a tire tread adapted to provide greater road gripping action than previously known tire treads.

Another object is to provide a tire tread construction which will reduce skidding to a minimum.

Another object of my invention is to provide a tire tread having a ribbed traction surface, which, during a lateral skid, permits some of the ribs to retain their normal positions, presenting a relatively flat surface to the road as in normal travel, and to provide traction for forward movement, and another set of ribs which will yield transversely of the tread, presenting road engaging surfaces to the pavement.

Still another object is to provide means for preventing the tire from picking up stones and the like in the circumferentially extending spaces between the ribs.

Other objects and advantages of the invention will be apparent during the course of the following description.

In the accompanying drawing forming a part of this specification:

Fig. 1 is a section of a tire shown in perspective, illustrating an embodiment of my invention.

Fig. 2 is a broken top plan view of the tread of Fig. 1.

Fig. 3 is a section of a tire shown in perspective illustrating a modification of my invention, and Fig. 4 is a broken top plan view of the tread shown in Fig. 3.

In the drawing, the numeral 11 indicates an automobile wheel rim, numeral 12 indicates the tire carcass, while the tread base is indicated at 13. The perimeter of the tread base is provided with a series of road engaging elements or ribs, extending circumferentially of the wheel axle and arranged in pairs and disposed in such manner that two ribs of each pair of ribs may be termed twins. Each set of twin ribs may be spaced laterally of the tire from the next set of twins as desired. The ribs comprising each pair are indicated by the numerals 14 and 14a, the ribs 14 and 14a of each pair of ribs being arranged in as close proximity as can be conveniently arranged according to tire manufacturing processes.

The tread disclosed herein is not limited to use on automobile tires, as it may be used on various tires and also may be used on belts and the like, adapted to transmit power.

The ribs 14 and 14a of each pair of ribs, have a greater depth at the sides which are adjacent to each other, as indicated at a, than at their outer sides, as indicated at b. This disposition of the ribs produces an arrangement that while the ribs project radially from the tread base, their individual root bases are at an inclination thereto. This results in a construction whereby the ribs of each pair are less flexible laterally of the tread base in one direction than they are in the opposite direction, or, in other words, each rib is more flexible in the direction away from its twin rib than in the direction towards its twin rib, thereby resulting in the ribs of each pair having greater flexibility in opposite directions.

For the purpose of increasing the general flexibility of the ribs, it will be advisable to divide the ribs into circumferentially extending sections by means of knife cuts 15, or in any suitable manner. Such arc shaped knife cuts extend laterally of the tread and are preferably arranged concentrically and spaced evenly circumferentially of the tread.

In order to illustrate the advantages of the ribs in minimizing skidding, it may be assumed that the tire illustrated in Figs. 1 and 2 is mounted on the rim of a motor vehicle which is in motion and which, for one reason or another, we will assume skids to the right, the ribs 14 will yield readily, presenting circumferentially edges of their traction faces to the pavement. Under such circumstances the ribs 14a will remain substantially in their normal position with their traction faces parallel with the pavement. Obviously if the skid is towards the left, the reverse of the above situation will occur and the ribs 14a will yield and the ribs 14 will remain substantially normal. The above disposition and arrangement of the ribs results in every other rib presenting a sharp edge to the pavement in order to reduce the skidding action, while the intervening ribs present normal flat traction surfaces to the pavement, serving to aid in the forward movement of the tire and thus tend to draw it out of the skidding movement.

Due to the revolution of the wheel during the skidding movement, the pressure of the constantly changing node of the deflected ribs against the adjacent upright ribs which, while not appreciably bending the upright ribs, will at the same time impart to them a sinuous or irregular distortion, which enhances the traction of the upright ribs, thereby compensating for the loss of traction surface caused by the lateral bending of the deflected ribs. Thus it will be seen that the tire will have substantially as much forward traction during the skidding movement as it has under normal operating conditions.

In the modified form of my invention illustrated in Figs. 3 and 4, the sets of twin ribs are spaced laterally a relatively wider distance apart than those shown in Figs. 1 and 2. This construction will be found to be better suited for certain types of tire loads as it materially increases the range of deflection of the ribs according to the direction of the skidding movement. In order to prevent stones and various objects lodging in the spaces between the sets of twin ribs, a series of fins is provided which extend circumferentially of the tire. Each fin 16 is disposed and extends up between one set of twin ribs and the set adjacent thereto, the fins 16 are preferably made and disposed so they do not extend flush with the outer surfaces of the other ribs.

The fins are of substantial thickness, in order that stones picked up when the fin buckles, as that particular part of the tire is in a road-engaging position, will be ejected as the buckled fin returns to its normal position, when the stone engaging portion thereof is in a non-road engaging position. Obviously, this result cannot possibly be accomplished by a narrow or weak fin, which will not have sufficient strength to cause it to return to its normal position, when it is in a non-road engaging position.

The root bases of the ribs 14 and 14a are positioned and arranged in the form of a V as clearly shown in the drawing.

It will be apparent to those skilled in the art that the invention herein disclosed may be variously changed, used or modified, without departing from the spirit of the invention or sacrificing the advantages thereof, and that the embodiment of my invention herein disclosed is illustrative only and that my invention is not limited thereto.

I claim:

1. A tire having a tread portion provided with a plurality of flexible spaced circumferentially extending ribs, arranged in pairs, each having greater lateral flexibility away from each other than toward each other, and circumferentially extending fins disposed between the pairs of ribs, said fins being shorter than said ribs and providing a bumper to prevent stones entering between said pairs of ribs.

2. A tire having a tread portion provided with a plurality of spaced circumferentially extending ribs, arranged in pairs, the root base of each rib being inclined relatively to the portion of the tread base on which it is positioned, said ribs being arranged in pairs with the root bases forming a V, whereby said ribs have greater flexibility away from each other than toward each other, and circumferentially extending fins disposed between the pairs of ribs, said fins being shorter than said ribs and providing a bumper to prevent stones entering between said pairs of ribs.

3. A tire tread provided with a plurality of circumferentially extending ribs of substantial thickness arranged in pairs each having greater lateral flexibility away from each other than toward each other, and spaced apart laterally of the tread base, a circumferentially extending stone ejecting fin extending radially from the axis of the tire and disposed between the pairs of ribs, said fin being shorter than said ribs and having substantial thickness, whereby stones becoming wedged between adjacent walls of the ribs and the fin cause said fin to buckle when said portion of the tire is in a road engaging position, said stones being ejected therefrom upon the return of the buckled fin to its normal position when such part of the tire is in a non-road engaging position, for the purposes described.

4. A tire tread provided with a plurality of circumferentially extending ribs of substantial thickness having side walls and spaced apart laterally of the tread base, circumferentially extending stone ejecting fins provided with side walls and positioned in the space separating adjacent ribs, said fins being shorter than said ribs having substantial thickness and being substantially narrower than said ribs, the adjacent side walls of said ribs and fins being disposed in spaced parallel relation to each other in such manner that the space between adjacent side walls is relatively narrow with respect to the width of the fin, whereby stones becoming wedged between adjacent walls of the ribs and fins cause said fins to buckle when said portion of the tire is in a road engaging position, said stones being ejected therefrom upon the return of the buckled fin to its normal position when such part of the tire is in a non-road engaging position, for the purposes described.

5. A tire tread provided with a plurality of circumferentially extending ribs of substantial thickness having side walls and spaced apart laterally of the tread base, circumferentially extending stone ejecting fins positioned radially with respect to the axis of the tire and provided with side walls and positioned in the space separating adjacent ribs, said fins being shorter than said ribs having substantial thickness and being substantially narrower than said ribs, the adjacent side walls of said ribs and fins being disposed in spaced parallel relation to each other in the general plane of the tire in such manner that the space between adjacent side walls is relatively narrow with respect to the width of the fin, whereby stones becoming wedged between adjacent walls of the ribs and fins cause said fins to buckle when said portion of the tire is in a road engaging position, said stones being ejected therefrom upon the return of the buckled fin to its normal position when such part of the tire is in a non-road engaging position, for the purposes described.

HUGH T. HUGHES.